June 8, 1965　　　　L. F. JAMES　　　　3,188,010
LUBRICATOR HAVING VALVE, CONDUIT AND ATOMIZER JUNCTURE MEANS
Filed May 8, 1963　　　　　　　　　　　　2 Sheets-Sheet 1

INVENTOR.
LEE F. JAMES
BY
*Woodling, Krost, Granger and Rust*
　　　　　　　attys

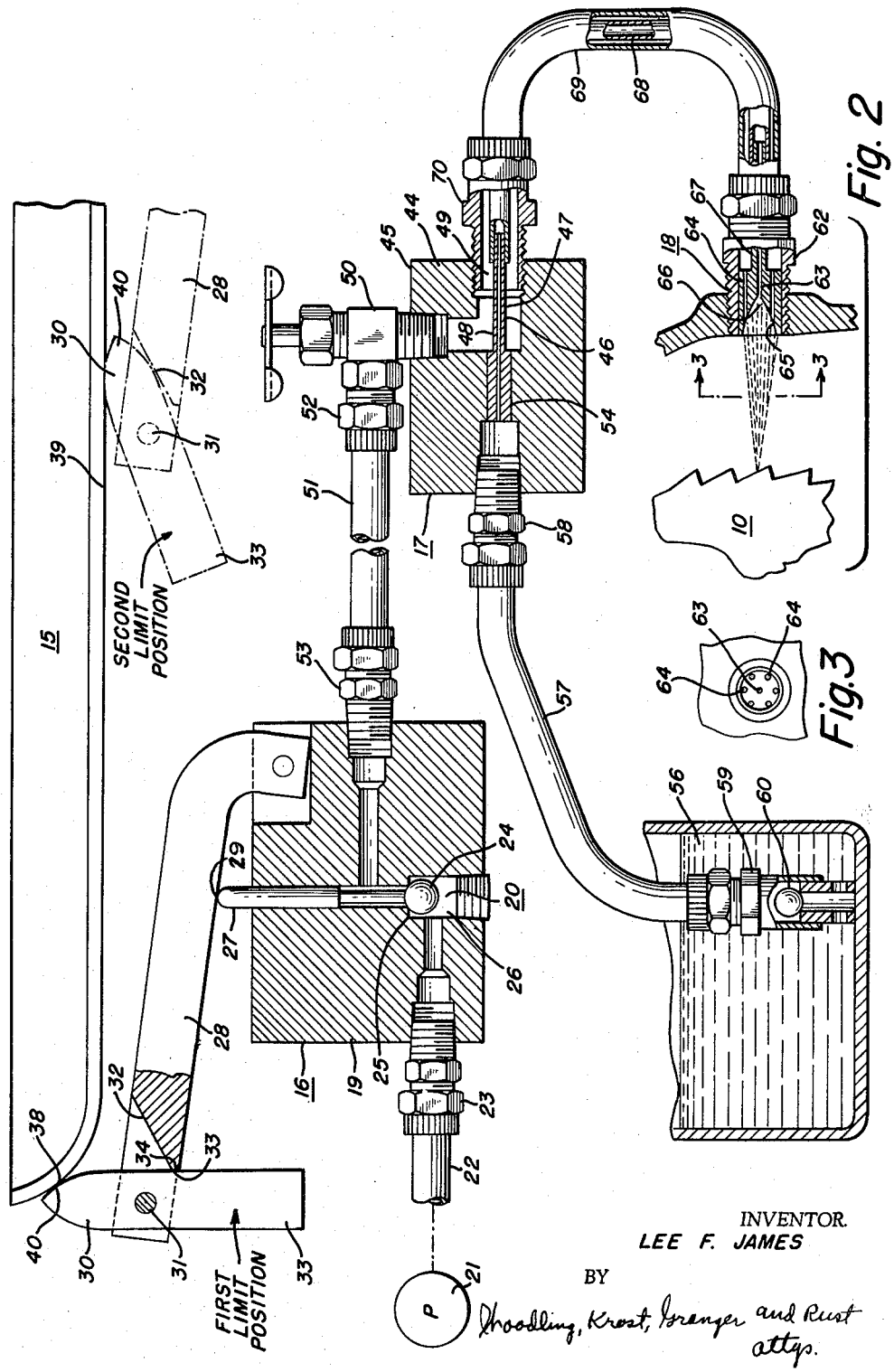

United States Patent Office 3,188,010
Patented June 8, 1965

3,188,010
LUBRICATOR HAVING VALVE, CONDUIT AND ATOMIZER JUNCTURE MEANS
Lee F. James, 915 W. 60th St., Hialeah, Fla.
Filed May 8, 1963, Ser. No. 278,840
5 Claims. (Cl. 239—412)

My invention relates to lubricators and more particularly to lubricators employing an atomizing principle for making a spray to lubricate an area.

An object of my invention is to provide, in a lubricator, valve control means free of springs and other associated parts which usually are the cause of much trouble and maintenance.

Another object is to provide, in a lubricator, an atomizer which controls the pattern or contour of the spray.

Another object is to provide a cam-lever valve actuator free of springs and other associated parts which usually are the cause of much trouble and maintenance.

Other objects and a fully understanding of the invention may be had by referring to the following description and claims, taken in conjunction with the accompanying drawing, in which:

FIGURE 2 shows a cross-sectional view of the main parts of my lubricator as illustrated in FIGURE 1; and FIGURE 3 is an end view of the atomizer taken along the line 3—3 of FIGURE 2, showing principally the arrangement of the lubricant orifice means and the air orifice means.

Figure 1:
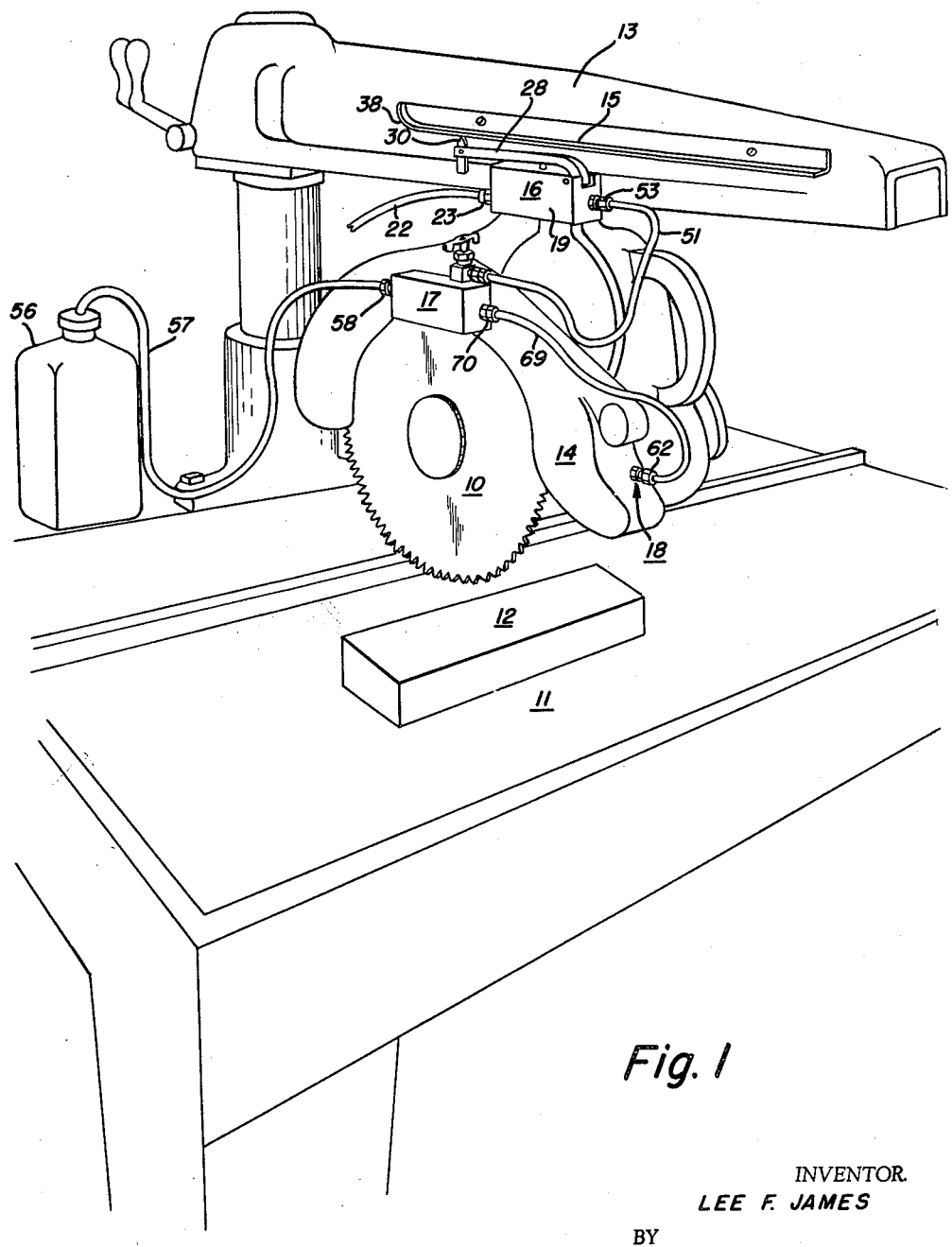
FIGURE 1 is a diagrammatic illustration of a lubricator embodying my invention which is shown as being applied to a saw.

With reference to the drawing, my lubricator is illustrated as being applied to a metal cutting saw, although it is to be understood that it may be applied to any cutting tool, work surface, or any other area where a lubricant or coolant is used.

The saw is identified by the reference character 10 and may be of any suitable type having a work table 11 upon which a workpiece 12 may be mounted for cutting. The saw mechanism is slidably movable on an arm 13 in a horizontal direction relative to the workpiece 12 and the saw cuts the workpiece as the saw is moved to the right against the workpiece. The saw 10 may be provided with the usual guard 14. A stationary cam 15 mounted on the arm 13 may be employed to control the "on" and "off" spray periods of my lubricator, in that the spray is turned "on" and directed upon the rotating saw when the saw is cutting the workpiece 12 and is cut off when the saw is being moved to the left on its return stroke. The saw 10 and the saw guard 14 move relative to the stationary cam 15 and this relative movement is employed to control the operation.

My lubricator comprises valve juncture means 16, conduit juncture means 17 and atomizer juncture means 18. With reference to FIGURE 2, the valve juncture means 16 comprises a valve body 19 having an air valve 20 which is connected to a source of compressed air 21 by means of a tube 22 and a fitting 23. The valve body 19 has a ball valve 24 and a valve seat 25 constituting the air valve 20. The valve ball 24 is mounted in a chamber 26 and may move freely away from the valve seat 25 by force of gravity to open the air valve 20. The valve ball 24 is held against the valve seat 25 in opposition to the force of gravity by the compressed air to close the air valve 20. The valve ball 24 is positively moved away from the valve seat 25 in opposition to the compressed air to open the air valve 20 by means of an actuator comprising a slidably mounted stem 27 and a pivotally mounted lever 28. The lever 28 may be pivotally mounted to the valve body 19 and is arranged to have an arm portion 29 for engaging and pressing down on the stem 27 for opening the air valve 20. The free end of the lever 28 is bifurcated and has a toggle member 30 pivotally mounted therebetween by means of a pivot pin 31. The bifurcated end of the lever 28 terminates in an inclined terminating end surface 32. The toggle member 30 is swingable between first and second limit positions. The first limit position is the upright position and is normally held in this position by the force of gravity since the portion 33 of the toggle member 30 below the pivot pin 31 is heavier than the portion above the pivot pin 31. In this first limit position, the right-hand side portion 33 of the toggle member 30 is engaging the lower edge 34 of the inclined terminating end surface 32 so that the toggle member 30 cannot swing or pivot in a counter-clockwise direction about the pivot pin 31. The second limit position of the toggle member 30 is shown in dash-dot lines and is the position when turned clockwise with the right-hand side thereof lying against the inclined terminating end surface 32 between the bifurcated ends of the lever 28.

The valve body 19 upon which the lever 28 is mounted is fixedly mounted with respect to the saw guard 14 so that as the saw 10 is moved relative to the workpiece 12, the toggle member 30 moves relative to a stationary cam 15 which is fixedly mounted with reference to the work table 11. The stationary cam 15 is provided with an inclined cam surface 38 and a straight bottom cam surface 39. When the saw is moved to the right toward the workpiece for cutting same, the upper end 40 of the toggle member 30 engages the inclined end cam surface 38 and depresses the lever 28 and the stem 27 to open the air valve 20. The air valve 20 remains open during the period that the upper end 40 of the toggle member 30 engages the straight bottom cam surface 39 as the saw is moved to the right. Upon the return stroke of the saw to the left, the friction between the bottom cam surface 39 and the upper end 40 of the toggle member 30 causes the toggle member to rotate in a clockwise direction until it hits the second limit position where the right-hand side of the toggle member 30 is lying against the inclined terminating end surface 32. When the toggle member 30 is in the second limit position, it is inoperative to depress the stem 27 and open the air valve 20. Therefore during the return stroke of the saw, the air is shut off by the air valve 20.

The conduit juncture means 17 is embodied in a block 44 which has an outer conduit wall 45 and a tube 46 mounted therein. The tube 46 has an inside wall or opening defining a lubricant conduit 47 and has an outside wall 48 defining with said outer conduit wall 45 an air conduit 49. The tube 46 may have an enlarged left-hand end which may be pressed into a bore 54 of the block 44 to hold the tube 46 in place. The air conduit 49 has connection means for connecting same to the air valve 20 through means of an adjustable valve 50 and a connecting flexible tube 51. The right-hand end of the tube 51 is connected to the adjustable valve 50 by means of a fitting 52 and the left-hand end of the tube 51 is connected to the air valve 20 by means of a fitting 53. The lubricant conduit 47 is connected to the source of lubricant in a container 56 by means of a flexible tube 57. The right-hand end of the tube 57 is connected to the lubricant conduit 47 by means of a fitting 58 and the bottom end of the tube 57, which is immersed in the lubricant, is provided with a fitting 59 having a ball check valve 60 to prevent the flow of lubricant back into the container 56.

The atomizer juncture means 18 comprises a fitting 62 having a lubricant orifice 63 and a plurality of air orifices 64. The fitting 62 has a flared wall 65 with a recessed apex 66. The lubricant orifice 63 comprises a central passage which terminates into the recessed apex 66. The air orifices 64 comprise a plurality of annularly disposed passages surrounding the central passage and terminate into the flared wall 65. The air passages closely surround the lubricant passage and create an atomizer to spray lubricant on the saw. The flared wall and arrangement of the orifices control the contour or shape of the spray to direct it upon the cutting face of the saw where it is most effective. The arrangement focuses the spray upon the teeth. The lubricant orifice 63 has a tube extension 67 which is connected to the tube 46 in the block 44 by means of a flexible tube 68. The air orifices are connected to the air conduit 49 by means of a flexible outer tube 69 having one end connected to the fitting 62 at the atomizer juncture means 18 and the other end connected to a fitting 70 at the conduit juncture means 17.

In operation, the atomizer sprays when the saw is moving toward the workpiece on the work stroke and is shut off on the return stroke when the saw is moving away from the workpiece. The lubricant is chilled as it leaves the lubricant orifice 63 and aids in cooling the saw. The valve 50 may be adjusted to vary the amount of the compressed air delivered to the atomizer juncture means 18.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A lubricator for connection to a source of compressed air and a source of lubricant, said lubricator adapted to spray a lubricant on an area to be lubricated and comprising in combination, valve juncture means, conduit juncture means, and atomizer juncture means, said valve juncture means having an air valve and connection means for connecting said air valve to said source of compressed air, said air valve having valve ball means and valve seat means, said valve ball means freely movable away from said valve seat means by force of gravity to open said air valve and held against said valve seat means in opposition to the force of gravity by said compressed air to close said air valve, actuator means for positively moving said valve ball means away from said valve seat means in opposition to said compressed air to open said air valve, said conduit juncture means having an outer conduit wall and a tube mounted therein, said tube having an inside wall defining a lubricant conduit and having an outside wall defining with said outer conduit wall an air conduit, said lubricant conduit having connection means for connecting same to said lubricant source, said air conduit having connection means for connecting same to said air valve, said atomizer juncture means having lubricant orifice means connected to said lubricant conduit and having air orifice means connected to said air conduit, said lubricant orifice means and said air orifice means being located closely adjacent to each other to define an atomizer to spray lubricant on said area to be lubricated.

2. The combination as defined in claim 1 and including adjustable valve means for controlling the flow of compressed air through said air orifice means.

3. The combination as defined in claim 1 and in which said lubricant orifice means comprises a central passage and said air orifice means comprises a plurality of annularly disposed passages surrounding said central passage.

4. The combination as defined in claim 1 in which said atomizer juncture means comprises a flared wall with a recessed apex, and in which said lubricant orifice means comprises a central passage terminating in said recessed apex and said air orifice means comprises a plurality of annularly disposed passages surrounding said central passage and terminating in said flared wall.

5. A lubricator for connection to a source of compressed air and a source of lubricant, said lubricator adapted to spray a lubricant on an area to be lubricated and comprising in combination, valve juncture means, conduit juncture means, and atomizer juncture means, said valve juncture means having an air valve and connection means for connecting said air valve to said source of compressed air, said air valve having valve ball means and valve seat means, said valve ball means freely movable away from said valve seat means by force of gravity to open said air valve and held against said valve seat means in opposition to the force of gravity by said compressed air to close said air valve, actuator means for positively moving said valve ball means away from said valve seat means in opposition to said compressed air to open said air valve, said conduit juncture means having an outer conduit wall and a tube mounted therein, said tube having an inside wall defining a lubricant conduit and having an outside wall defining with said outer conduit wall an air conduit, said lubricant conduit having connection means for connecting same to said lubricant source, said air conduit having connection means for connecting same to said air valve, said atomizer juncture means having lubricant orifice means connected to said lubricant conduit and having air orifice means connected to said air conduit, said lubricant orifice means and said air orifice means being located closely adjacent to each other to define an atomizer to spray lubricant on said area to be lubricated, said actuator means comprising a pivotally mounted lever and a slidably mounted stem actuated by downward movement of said lever to press said valve ball means away from said valve seat means in opposition to said compressed air to open said air valve, a toggle member pivotally mounted on said lever and swingable between first and second limit positions, said toggle member being swingable to said first limit position by the force of gravity, cam means to engage said toggle member, said cam means and said toggle member being movable in first and second directions relative to each other, relative movement of said cam means and said toggle member in said first direction constraining said toggle member in said first limit position and actuating said lever and stem in a downward movement to thereby open said air valve, relative movement of said cam means and said toggle member in said second direction constraining said toggle member to said second limit position, said toggle member in said second limit position being ineffective to actuate said lever and said stem in a downward movement to open said air valve.

References Cited by the Examiner

UNITED STATES PATENTS

| | | | |
|---|---|---|---|
| 1,824,363 | 9/31 | Norgren | 239—407 |
| 2,057,434 | 10/36 | Jaden et al. | 184—56 |
| 2,080,206 | 5/37 | Holmboe | 239—418 |
| 2,270,932 | 1/42 | Cornelius | 251—231 |
| 2,707,657 | 5/55 | Paasche | 184—56 |
| 2,840,339 | 6/58 | Price | 251—231 |
| 2,850,323 | 9/58 | Veres | 239—413 |
| 2,868,584 | 1/59 | Faust | 239—407 |
| 2,895,684 | 7/59 | Harr | 239—407 |
| 2,913,187 | 11/59 | Anderson | 239—412 |
| 3,004,719 | 10/61 | Pouppirt | 239—412 |
| 3,037,709 | 6/62 | Bok et al. | 239—412 |
| 3,104,677 | 9/63 | Fleckenstein et al. | 137—434 |
| 3,106,346 | 10/63 | Thomas | 239—424 |

EVERETT W. KIRBY, *Primary Examiner.*